(12) United States Patent
Ootake et al.

(10) Patent No.: US 6,408,697 B1
(45) Date of Patent: Jun. 25, 2002

(54) PRESSURE DETECTION APPARATUS WITH SQUEEZING PROTECTION MEMBER

(75) Inventors: Seiichiro Ootake, Hazu-gun; Kazuhiro Chiku, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/522,078

(22) Filed: Mar. 9, 2000

(30) Foreign Application Priority Data

Mar. 12, 1999 (JP) .......................................... 11-066949
Feb. 23, 2000 (JP) ...................................... 2000-052165

(51) Int. Cl.$^7$ ................................................ G01L 7/00
(52) U.S. Cl. .............................. 73/714; 73/706; 73/756
(58) Field of Search ........................ 73/714, 706, 745, 73/726, 756

(56) References Cited

U.S. PATENT DOCUMENTS

| | | | | |
|---|---|---|---|---|
| 4,669,317 A | * | 6/1987 | Delajoud | 73/701 |
| 4,843,454 A | * | 6/1989 | Kato et al. | 257/419 |
| 5,000,047 A | * | 3/1991 | Kato et al. | 338/4 |
| 5,456,676 A | * | 10/1995 | Nelson et al. | 604/533 |
| 5,468,298 A | * | 11/1995 | Lei et al. | 118/715 |
| 5,595,939 A | * | 1/1997 | Otake et al. | 438/51 |
| 5,847,282 A | * | 12/1998 | Keller | 73/706 |
| 6,076,409 A | * | 6/2000 | Bang | 73/756 |
| 6,186,009 B1 | * | 2/2001 | Miyano et al. | 73/756 |

FOREIGN PATENT DOCUMENTS

| | | |
|---|---|---|
| JP | 7-43230 | 2/1995 |
| JP | 7-209115 | 8/1995 |
| JP | 7-243926 | 9/1995 |
| JP | 10-115536 | 5/1998 |

* cited by examiner

*Primary Examiner*—Max Noori
*Assistant Examiner*—Lilybett Martir
(74) *Attorney, Agent, or Firm*—Law Offices of David G. Posz (57) ABSTRACT

A pressure detection apparatus capable of preventing an O-ring, which is sandwiched by a first case and a second case, from being squeezed to a gap between the first case and the second case. A pressure detection apparatus is formed by assembling a connector case as the first case, which includes a depression portion in which a sensor element is contained, and a housing as the second case. The housing includes a main body portion having a pressure introduce hole. A seal diaphragm and a press member are welded to the main body portion. A pressure detection chamber for containing oil is defined between the depression portion of the connector case and the seal diaphragm. At an outer peripheral portion of the pressure detection chamber, an O-ring is inserted to a groove formed at one end surface of the connector case. An outer peripheral portion of groove portion is defined as an outer peripheral wall. A corner portion is defined by a side surface and a contact surface of the outer peripheral wall. A round portion of the corner portion has a radius of curvature is set less than 0.1 mm. As a result, it can prevent the O-ring from being squeezed to a gap between the connector case and the housing.

12 Claims, 10 Drawing Sheets

PRESSURE DETECTION APPARATUS WITH SQUEEZING PROTECTION MEMBER

CROSS REFERENCE TO RELATED APPLICATION

This application is based upon Japanese Patent Application Nos. Hei. 11-66949 filed on Mar. 12, 1999, and 2000-52165 filed on Feb. 23, 2000, the contents of which are incorporated herein by reference.

BACKGROUND OF THE INVENTION

1. Field of the Invention

This invention relates to pressure detection apparatuses, and particular to a pressure detection apparatus in which a pressure detection chamber for containing a sensor element is manufactured by assembling a first case and a second case and is liquid-tightly sealed by an O-ring sandwiched between the first case and the second case (O-ring sealing type), the method of manufacturing the same, and a molding apparatus for manufacturing the same.

2. Related Art

Conventional pressure detection apparatuses of this type (O-ring sealing type) have been proposed in JP-A-7-209115 and JP-A-243926. These documents have proposed: a seal diaphragm type semiconductor pressure detection apparatus, which aims at a decreasing of the number of parts, a simplification of the manufacturing step, and an improvement of reliability; and a manufacturing method of the same. These pressure detection apparatuses are mainly used for detecting a pressure within a range of 0–10 MPa, for example, a coolant pressure of an air-conditioner for vehicles or a pressure of a power steering oil of a vehicle.

It can be thought that this type of the pressure detection apparatus is applicable to the other purpose such that for detecting pressure of a brake oil or high-pressured fuel oil. In these purposes, the pressure detection sensor is used for detecting a high pressure within a range of 0–20 MPa. However, according to an experimental result, it is found that the O-ring for liquid-tightly sealing the pressure detection chamber may be damaged.

Figure 13A:
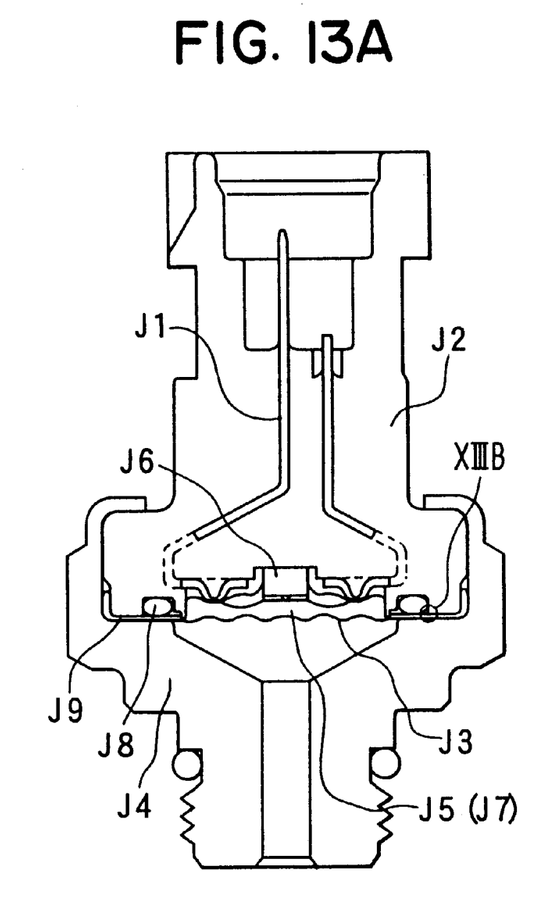
FIG. 13A is a schematic sectional view of a pressure detection apparatus according to a related art.
Figure 13B:
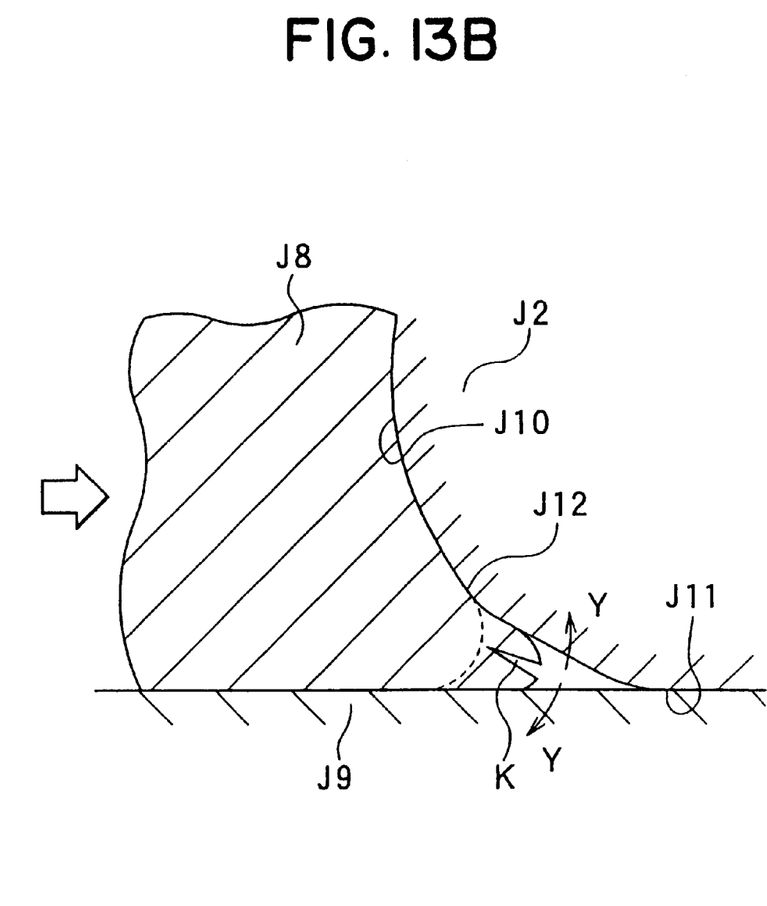
FIG. 13B is an enlarged sectional view at a circle XIIIB in FIG. 13A.

A mechanism of occurrence of the damage is further analyzed. FIG. 13A shows a schematic sectional view of an O-ring sealing type pressure detection apparatus (related art), which is manufactured by modifying the above-described conventional method, and FIG. 13B shows an enlarged sectional view of a circle XIIIB in FIG. 13A. A pressure detection chamber J5 is formed by assembling a resin case (first case), which is formed by molding and includes a connector pin J1, and a metallic housing (second case), which includes a seal diaphragm J3. A sensor element J6 is contained in the pressure detection chamber J5 by being fixed to a seat.

Furthermore, oil J7 is filled in the pressure detection chamber J5 for transmitting pressure from the seal diaphragm J3. At an outer peripheral portion of the pressure detection chamber J5, a grove (O-ring groove) is formed at an end surface of the resin case J4. An O-ring J8 is provided in the O-ring groove so that the O-ring is sandwiched by a press member J9, which is a part of the housing J4, and the resin case J2. The pressure detection chamber J5 is liquid-tightly sealed by the O-ring J8.

This kind of pressure detection apparatus is generally formed as follows. At first, the resin case J2 is formed by molding. The pressure detection chamber J5, which contains the sensor element J6 therein, is formed by assembling the resin case J2, in which the oil J7 is filled in a depression portion as the pressure detection chamber J5, and the housing J4. At the same time, the O-ring is sandwiched by the case J2 and the housing J4 at the outer peripheral portion of the pressure detection chamber J5 with being pressed. Furthermore, the case J2 and the housing J4 are fixed and assembled by caulking. In this way, a basic structure of the pressure detection apparatus is formed.

According to this apparatus, when a pressure to be detected is applied to the pressure detection chamber J5, the O-ring J8 is pressed toward an arrow in FIG. 13B. However, movement of the O-ring J8 toward outer peripheral direction is restricted by an outer sidewall surface J10. That is, the outer sidewall surface J10 acts as a wall portion for restricting the O-ring. In this time, the O-ring J8 is squeezed into a gap between the outer sidewall surface J10 and the press member J9.

Here, according to this related art, when the pressure to be detected is within 0–10 MPa, a degree of squeezing of the O-ring J8 to the gap is that as shown by a dotted line in FIG. 13B. However, when the pressure to be detected becomes high such as around 20 MPa, a degree of squeezing is increased as that shown by a solid line in FIG. 13B, so that the O-ring J8 is deformed. As a result, at a tip portion of a squeezed portion, tensile stress is undergone toward a direction shown by an arrow Y, so that crack may occur in the tip portion. When the pressure to be detected is repeatedly changed, the crack may advance, so that the O-ring J8 may be damaged.

The damage of the O-ring may determinate a sealing ability of the pressure detection chamber J5, and may decrease reliability of the apparatus. Here, similar inconvenience may occur at a gap between the wall portion and the end surface of the resin case J2, when the wall portion for restricting the O-ring is provided at the housing J4 side instead of the resin case J2. Furthermore, the similar inconvenience may occur, when a metallic case is applied instead of the resin case J2, as long as the case J2 is formed by being pressed or forged.

In other words, when the above-described wall portion is provided at least one of the first case and the second case being assembled with the first case, the inconvenience, in which the O-ring may be damaged due to squeezing of the O-ring to the gap between the first case and the second case, may occur.

SUMMARY OF THE INVENTION

This invention has been conceived in view of the background thus far described and its object is to prevent an O-ring, which is sandwiched by a first case and a second case, from being squeezed to a gap between the first case and the second case.

According to the present invention, a pressure detection apparatus having a wall portion is provided at opposite side of the pressure detection chamber with respect to the O-ring. The wall portion has a first surf ace and a second surf ace defining a corner portion with the first surface. Here, a radius of curvature of the corner portion is set less than 0.1 mm. As a result, it can restrict the O-ring from being squeezed into a gap between a first case and a second case at the corner portion.

According to another aspect of the present invention, a pressure detection apparatus having a wall portion being provided at opposite side of the pressure detection chamber with respect to the O-ring. The wall portion has a first surface and a second surface defining a corner portion with the first surface. Here, a distance between an end of the first surface and a flat surface, which is the same as the second surface, is set less than 0.1 mm. As a result, it can restrict the O-ring from being squeezed into a gap between a first case and a second case at the corner portion.

According to still another aspect of the present invention, a pressure detection apparatus having a wall portion being provided at opposite side of the pressure detection chamber with respect to the O-ring. The wall portion has a first surface and a second surface defining a corner portion with the first surface. The second case sandwiches the O-ring with the first case by contacting the second surface. Here, the corner has an O-ring squeezing protection member provided at the corner portion to contact with the second surface, and projected from the first surface toward the O-ring. As a result, O-ring squeezing protection member can restrict the O-ring from being squeezed into a gap between a first case and a second case at the corner portion.

According to further still another aspect of the present invention, a method of manufacturing a pressure detection apparatus, comprising the steps of assembling the first case and a second case to define the pressure detection chamber, with sandwiching the O-ring between the first case and the second case at a peripheral portion of the pressure detection chamber. In this assembling step, the O-ring is inserted to the groove portion; and the O-ring is pressed to cover the groove portion with the second case with crushing the projection portion of the corner portion. According to this method, since the projection portion is expanded as a result of being crushed, the crushed projection portion can restrict the O-ring from being squeezed into a gap between a first case and a second case at the corner portion.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

Hereinafter, several preferred embodiments of the present invention will be explained.
(First Embodiment)

Figure 1:
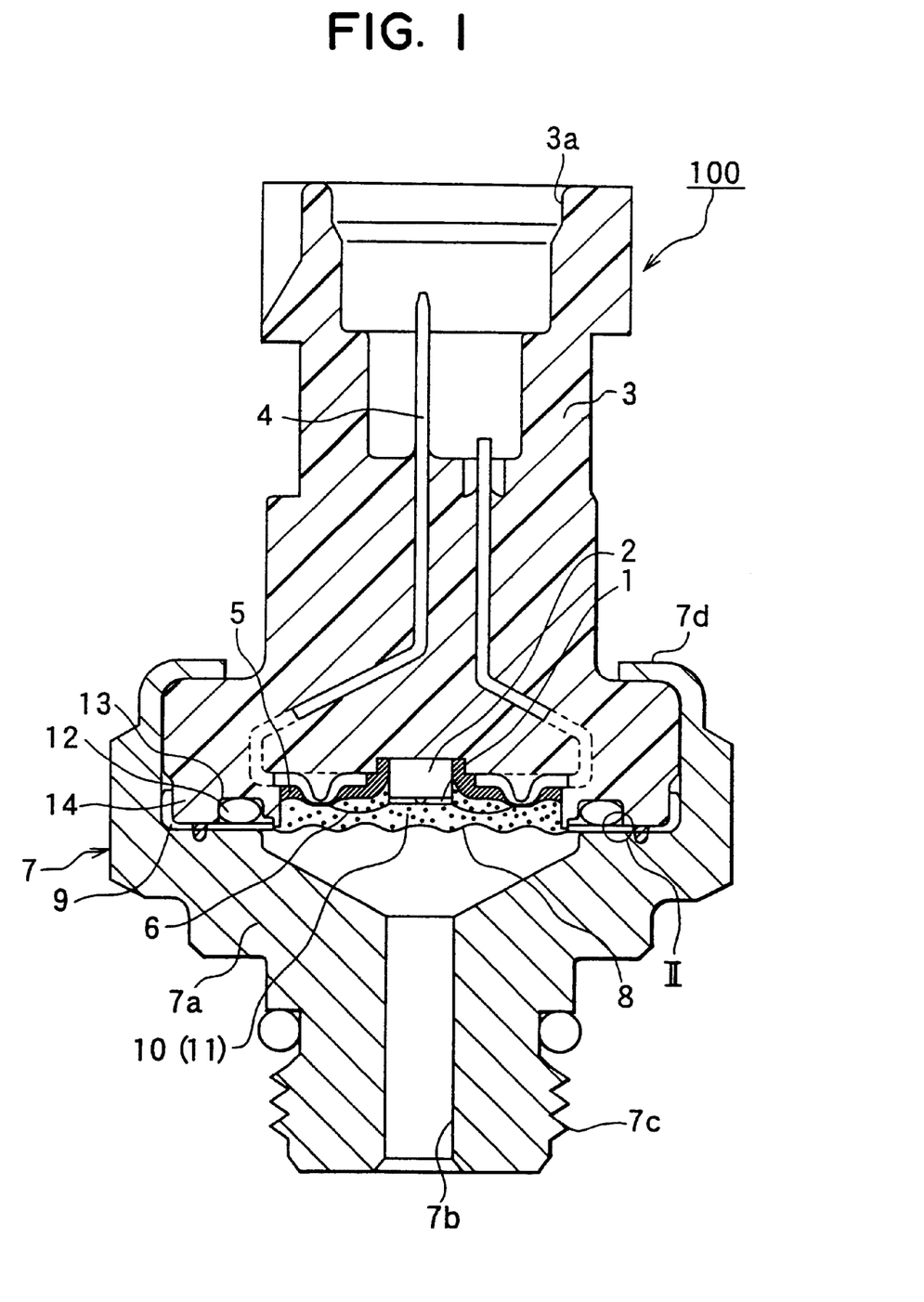
FIG. 1 is a schematic sectional view of a pressure detection apparatus of a first embodiment according to the present invention.

FIG. 1 shows a schematic sectional view illustrating a pressure detection apparatus 100 of a first embodiment. The pressure detection apparatus 100 is applicable for a vehicle-mounted high pressure detection apparatus, which can detect, for example, brake oil pressure, high-pressured fuel, and so on.

In FIG. 1, a sensor element (integrated sensor element) 1 for converting a pressure signal into an electric signal is anodically bonded to a seat 2 made of glass. The seat 2 is fixed to a depression portion of a connector case (first case) 3 by using adhesive such as silicon gum.

The connector case 3 is manufactured by molding of resin. A connector pin 4 for outputting the electric signal is provided in the connector case 3 by being integrally formed therewith by using an insert-mold. The connector case 3 has a connecting portion 3a for electrically connecting one end of the connector pin 4 with an external circuit (e.g., ECU of a vehicle) through, for example, a wire harness. Here, another end of the connector pin 4 is sealed in the depression portion of the connector case 3 by using interfacial sealant 5 such as silicon gum.

Furthermore, at the depression portion of the connector case 3, the sensor element 1 is electrically connected with the another end of the connector pin 4 through a bonding wire 6, which is made of a wire bonding or the like. Electric signals from the sensor element 1 are transmitted to the external circuit through the bonding wire 6 and the connector pin 4.

A housing (second case) 7 is provided with a main body portion 7a made of metal (e.g., plated carbon steel). The main body portion 7a has a pressure introduce hole 7b through which the pressure to be detected is introduced, and a screw portion 7c for fixing the apparatus to a preferred position.

Furthermore, in the housing 7, a seal diaphragm 8 made of thin metal such as SUS (stainless steel) and a press member (welded-ring) 9 are welded to the main body portion 7a at all of surrounding portion thereof, so that the seal diaphragm 8 and the press member 9 are liquid-tightly bonded to one end of the pressure introduce hole 7b.

The connector case 3 and the housing 7 are fixed by being assembled using caulking or the like. A pressure detection chamber 10 is defined between the depression portion of the connector case 3 and the seal diaphragm 8 of the housing 7. Oil 11 as a sealed liquid as a pressure transmission medium is sealed in the pressure detection chamber 10, and a liquid sealing structure is defined by the seal diaphragm 8 and the interfacial sealer 5.

Furthermore, at an outer peripheral portion of the pressure detection chamber 10, an O-ring 12 for liquid-tightly sealing the pressure detection chamber 10 is inserted to a groove (O-ring groove) 13. The groove 13 is formed at one end surface of the connector case 3 at a peripheral position, which positions at the outer peripheral portion of the pressure detection chamber 10. The groove portion 13 is formed in a ring shape corresponding to an outer shape of the O-ring 12. The O-ring 12 is inserted in this groove portion 13, and is sandwiched and pressed by the connector 3 and the press member 9 of the housing 7.

Figure 2:
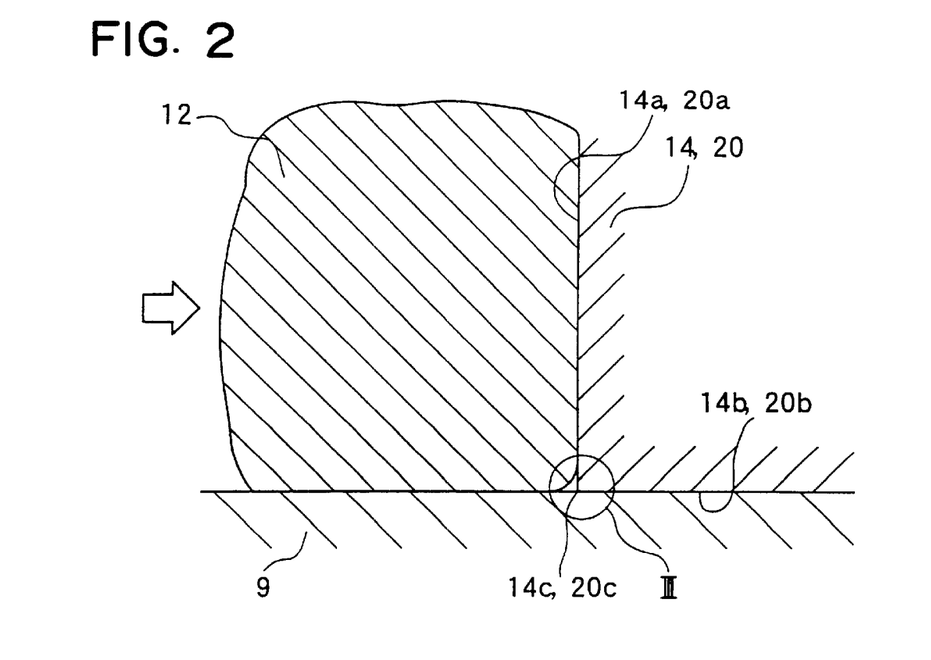
FIG. 2 is an enlarged sectional view at a circle II in FIG. 1.

HERE, FIG. 2 is an enlarged sectional view of a circle II in FIG. 1, and shows a detail structure of the O-ring 12 and the groove portion 13. In this pressure detection apparatus 100, pressure to be detected is introduced through the pressure introduce hole 7b, and is applied to the O-ring 12 via the seal diaphragm 8 and the oil 11, toward a direction indicated by an arrow in FIG. 2. As a result, the O-ring 12 is pressed to an outer peripheral direction.

In this case, since the O-ring 12 contacts with a side surface (first surface) 14a of an outer peripheral wall (wall portion) 14 of the groove portion 13, movement of the O-ring 12 toward the outer peripheral direction is restricted. A contact surface (second surface) 14b of the outer peripheral wall 14 contacts with the press member 9 of the housing 7.

Figure 3:
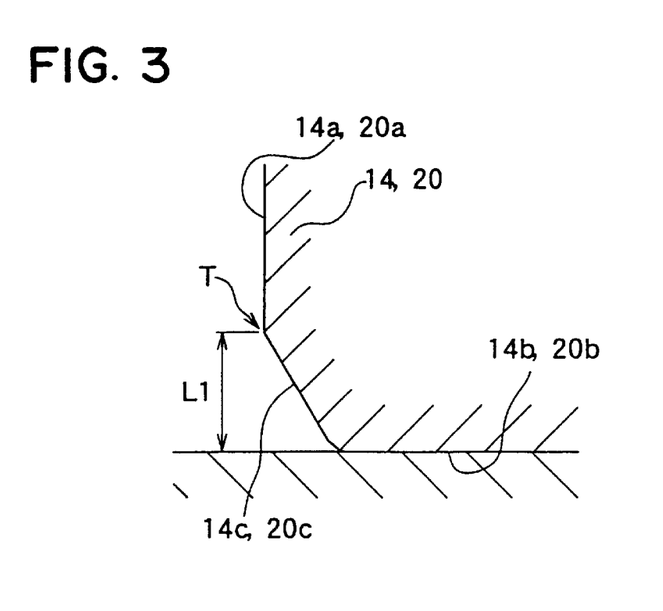
FIG. 3 is an enlarged sectional view at a circle III in FIG. 2.

In this embodiment, a corner portion 14c is defined by the side surface (first surface) 14a and the contact surface (second surface) 14b at the outer peripheral wall 14. The corner portion 14c causes a round portion having a radius of curvature less than 0.1 mm. Furthermore, as shown in FIG. 3, which is an enlarged sectional view of a circle III in FIG. 2, a distance L1 from an end portion of the side surface 14a to a surface including the contact surface 14b (an upper flat surface of the press member 9 contacting with the contact surface 14b) is less than 0.1 mm (O-ring squeezing protection structure). In other words, a distance L1 from an end portion T of the side surface 14a to a surface corresponding to the contact surface 14b is less than 0.1 mm.

When the distance L1 is less than 0.1 mm at the corner portion 14c, the corner portion 14c may not have round portion and may have oblique surface instead, furthermore a shape of the corner portion 14c is not limited as long as the distance L1<0.1 mm.

Hereinafter, a method of manufacturing the pressure detection apparatus 100 having the above-described structure will be explained.

Figure 4:
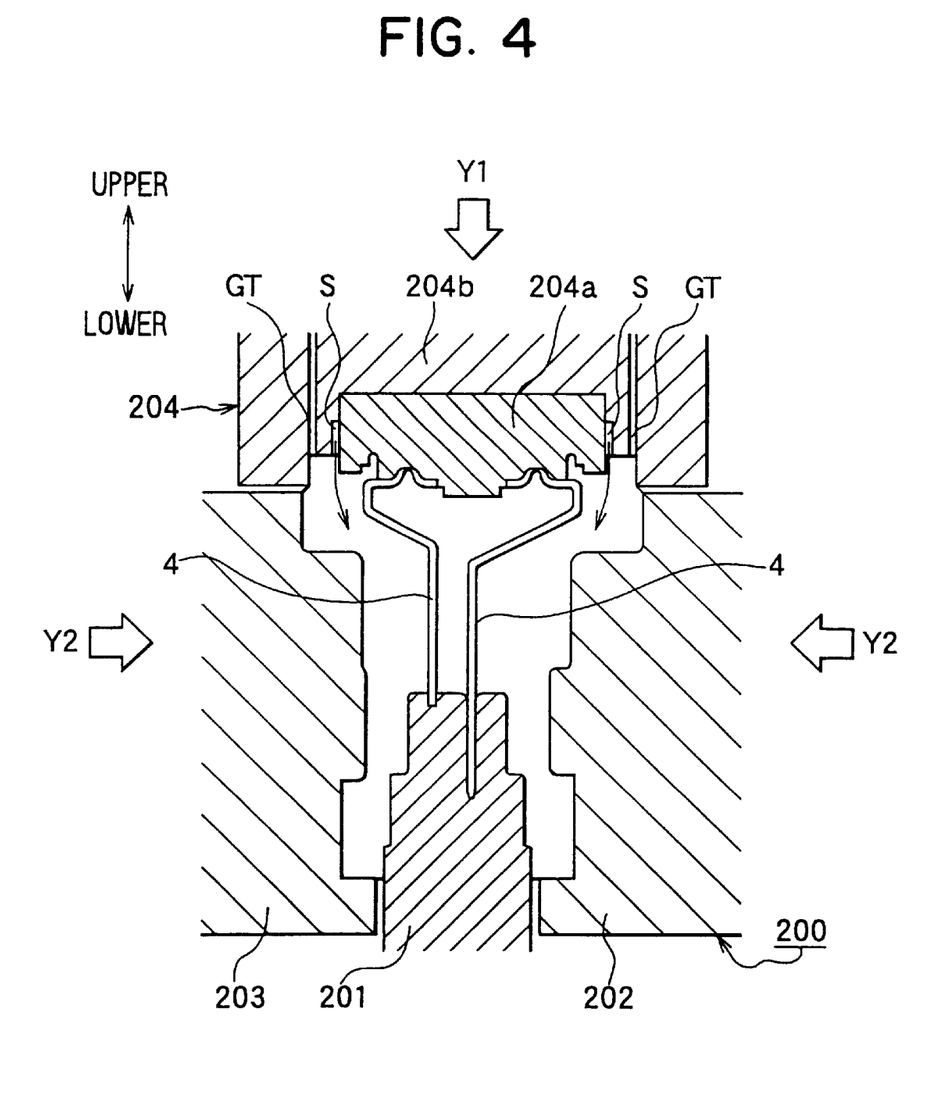
FIG. 4 is a schematic sectional view of a forming mold of a molding apparatus of the present invention.

At first, the connector case 3 is formed by molding using thermoplastic resin such as PPS (polyphenylene sulfide) (molding-forming process). FIG. 4 is a schematic sectional view of a molding apparatus (resin molding apparatus) used for this molding-forming process. In detail, FIG. 4 shows a schematic sectional view of a forming mold 200.

The forming mold 200 has a shape corresponding to an outer peripheral shape of the connector case 3, which is substantially cylindrically formed and has steps. In detail, the forming mold 200 is made up of a first forming mold 201 corresponding to the connecting portion 3a of the connector case 3, a second and a third forming molds 202 and 203 corresponding to the side surface of the connector case 3, and a fourth forming mold 204 corresponding to the depression portion of the connector case 3.

Here, the fourth forming mold 204 is made up of two dividable molds 204a and 204b, and defines the groove portion 13 at an area where positions outer peripheral portion of the depression portion in the depression portion side end surface of the connector case 3. Gap S between the these two dividable molds 204a and 204b is positioned in accordance with the corner portion 14c, which defined by the side surface 14a of the outer peripheral wall 14 (outer peripheral sidewall surface of the groove portion 13) and the contact surface 14b of the outer peripheral wall 14 to be contacted with the press member 9 (end surface of the first case).

Furthermore, the dividable mold 204b is provided with an injection gate GT for injecting the resin under melted condition to inside of the forming mold 200. The first forming mold 201 is provided with an insert hole, which fixes the connector pin 4 by inserting the same during an insert mold of the connector pin 4 when the connector case 3 is formed.

These first, second, third and fourth forming molds 201–204 are movable to be assembled or disassembled each other, by oil pressure or motor of not shown molding apparatus.

According to the molding-forming process using the molding apparatus shown in FIG. 4, at first, the connector pin 4 is inserted to the insert hole of the fixed first forming mold 201 so that the connector pin 4 is fixed. Next, the forming mold 204, which is formed by assembling the two dividable molds 204a and 204b, is downwardly moved toward a direction Y1 in FIG. 4 until the fourth forming mold 204 contacts with the connector pin 4, so that the connector pin 4 is supported by the dividable mold 204a by being pressed.

Next, the second and the third forming molds 202 and 203 are laterally (along a direction Y2 in FIG. 4) moved to a predetermined position corresponding to the outer peripheral shape of the connector case 3 (e.g., a position at which the second and the third forming molds 202 and 203 contact with the first and the fourth forming molds 201 and 204). In this way, the first to fourth forming molds 201–204 are assembled, and the forming mold 200 having the shape corresponding to the outer peripheral shape of the connector case 3 can be completed.

Next, the resin such as the PPS under melted condition is injected to the inside of the forming mold 200 through the injection gate GT of the fourth forming mold 204. After the resin in the forming mold 200 is hardened, the first to the fourth forming molds 201–204 are disassembled, so that the completed connector case 3 is taken out.

Figure 5A:
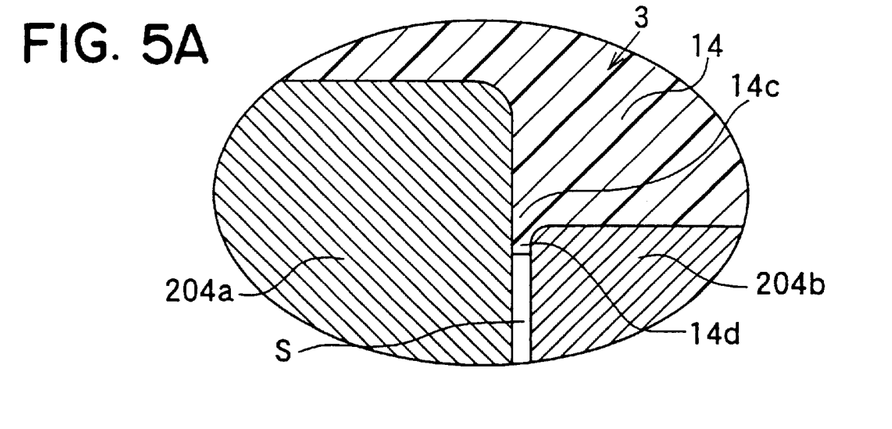
FIGS. 5A–5E are schematic sectional views illustrating an O-ring and its adjacent area during manufacturing the pressure detection apparatus.

Here, FIGS. 5A–5E are schematic sectional views illustrating the O-ring and its adjacent area during manufacturing the pressure detection apparatus 100. As described the above, the gap S between two dividable molds 204a and 204d position so as to correspond with the corner portion 14c. Therefore, during the forming-molding process, as shown in FIG. 5A, the injected resin is overflowed to the gap S. As a result, a projection portion (a fin) 14d, which projects from the end surface of the connector case 3 at the corner portion 14c, is formed.

Figure 5B:
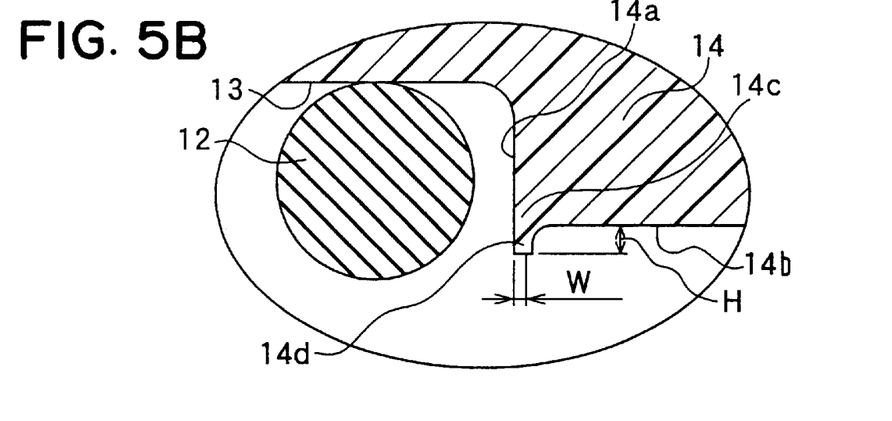
Figure 5C:
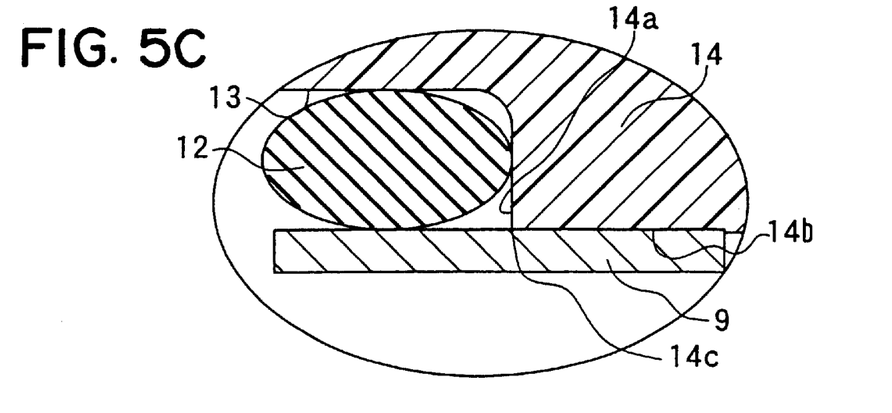

The projection portion 14d is crushed in an assembling step described later, and causes the corner portion 14c to be the above-described distinctive structure. FIG. 5B shows a shape of the projection portion 14d (and the O-ring 12 in a condition before being assembled). It is preferable to set a shape of the projection portion 14d to have a width W equal to or less than 0.2 mm and a height H equal to or less than 0.2 mm, in order to restrain a projection when the projection portion 14d is cracked by the press member 9 in the later process. Hence, the forming-molding process is completed.

Next, an assembling process will be performed. The seat 2 and the sensor element 1 are provided on the depression portion of the connector case 3 in which the projection portion 14d is formed. The sensor element 1 and the connector pin 4 are electrically connected by the bonding wire 6. After that, the O-ring is mounted on inside of the groove portion 13. The connector case 3 is arranged so that the sensor element 1 positions at upper side. Next, the oil 11 is injected from upper side of the depression portion of the connector case 3, for a constant quantity by using a dispenser or the like.

After that, the housing 7, to which the seal diaphragm 8 is welded at whole surrounding areas, is downwardly moved with keeping its horizontality so that the connector case 3 is inserted and fitted to the housing. The housing 7 and the connector case 3 are fixed by caulking the end surface 7d of the housing 7 at the whole surrounding areas, while the housing 7 is downwardly pressed so that an upper end surface of the connector case 3 sufficiently contacts with the press member 9 of the housing 7. In this way, the connector case 3 and the housing 7 are assembled and the pressure detection chamber 10 is completed.

Here, when the housing 7 is pressed so that the connector case 3 and the press member 9 are sufficiently contacted with each other, at the same time, the press member 9 covers the groove portion 13 as a result of crushing the projection portion 14d of the connector case 3 and also presses the O-ring 12. Since the projection portion 14d is crushed and is expanded, the corner portion 14c of the outer peripheral wall 14 of the groove portion 13 is formed to the above-described distinctive structure (O-ring squeezing protection structure), that is, the round portion caused at the corner portion 14c has a radius of curvature less than 0.1 mm, or a distance L1 less than 0.1 mm.

Figure 5D:
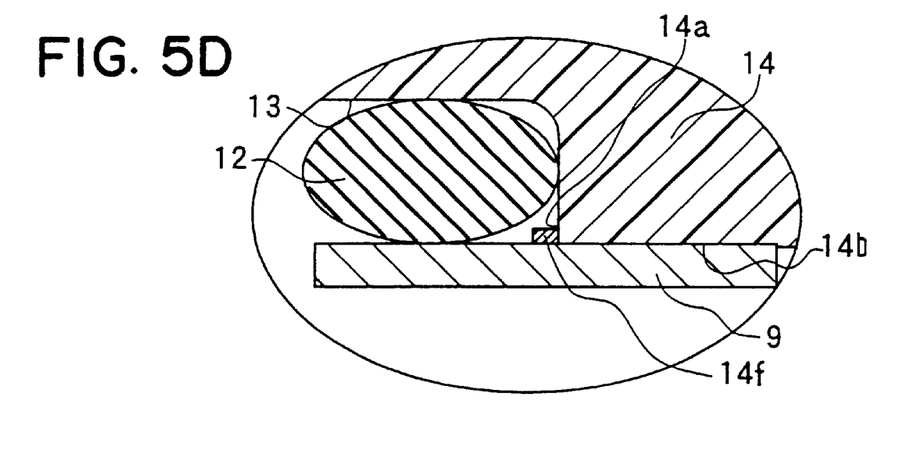
Figure 5E:
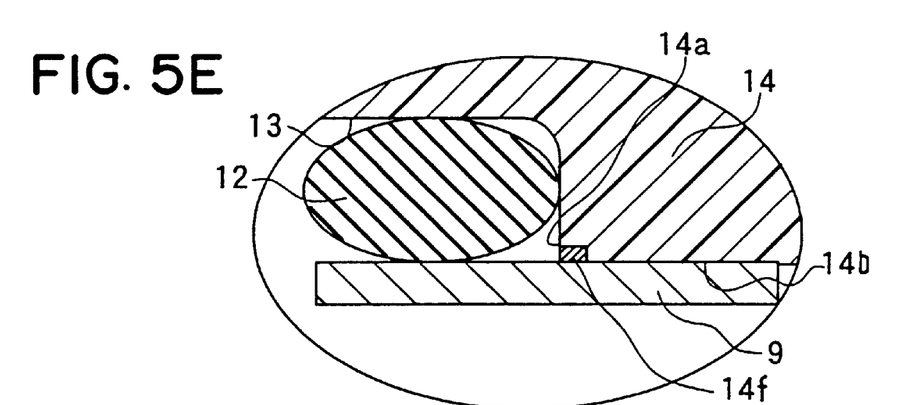

Here, there are two cases when the projection portion 14d is crushed, as shown in FIGS. 5D and 5E. FIG. 5D shows a sectional view of the crushed projection portion 14d when it fell down toward the O-ring side (inside); and FIG. 5E shows that when it fell down toward opposite side of the O-ring side (outside).

When the projection portion 14d is fallen down to the inside so as to form a portion 14f, since there is not enough gap into which the O-ring is squeezed, the O-ring is not squeezed into the gap, so that the O-ring will not be damaged. On the contrary, when the projection portion 14d is fallen down to the outside so as to form a portion 14f, since the radius of curvature is less than 0.1 mm, or a distance L1 is less than 0.1 mm, that is there is not enough gap into which the O-ring is squeezed, the O-ring is also not squeezed into the gap, so that the O-ring will not be damaged.

Here, as shown in FIG. 5B, the projection portion 14d is vertically formed along the side surface 14a of the outer peripheral wall 14, and a round portion is formed at root portion at the contact surface 14b side of the outer peripheral wall 14. In this case, the projection portion 14d tends to fall down to the O-ring 12 side. However, since the projection portion 14d is efficiently small, not all portions of the projection portion 14d are fallen down to a particular one side, but may be partly fallen down to the inside and partly to the outside.

In this way, the pressure detection chamber 10 is completed by sandwiching the O-ring with the connector case 3 and the housing 7. Hence, the assembling process is completed.

Here, the oil 11, which is liquid-tightly sealed in the pressure detection chamber 10, may include bubble just after being sealed. However, the bubble can be removed by applying pressure from the pressure introduce hole 7b, as shown in JP-A-243926, after the assembling process. Thus, the pressure detection apparatus 100 shown in FIG. 1 is completed.

According to this embodiment, since the corner portion 14c of the outer peripheral wall 14 of the groove portion 13 is formed to the above-described distinctive structure (O-ring squeezing protection structure), that is, the corner portion 14c has a round portion having a radius of curvature less than 0.1 mm, or a distance L1 less than 0.1 mm, it can restrain the O-ring from being squeezed into a gap between the corner portion 14c and the press member 9, compared to the related art, whose radius of curvature of a corner portion is equal to or more than 0.1 mm. As a result, the pressure detection apparatus 100 having a structure, which can prevent the O-ring from being damaged, can be provided.

Furthermore, according to the above-described manufacturing method, the projection portion 14d can be easily formed at the corner portion 14c, by protruding the resin into the gap S in a divided portion of the forming mold 200. Furthermore, since the projection portion 14d is expanded by being crushed, the round portion of the corner portion 14c can be substantially eliminated. As a result, a part of crushed projection portion 14d is projected from the side surface 14a of the outer peripheral wall 14, or compensates (covers) the round portion of the corner portion 14c even if it is not projected from the side surface 14a of the outer peripheral wall 14. Hence, the above-described distinctive O-ring squeezing protection structure can be realized.

On the other hands, according to the manufacturing method of the related art, it is difficult to set the radius of the curvature to less than 0.1 mm even if try to set, because remains or scrapings due to worn of the mold or resin would remain at the corner portion 14c. On the contrary, according to this embodiment, the radius of the curvature can be easily set to less than 0.1 mm.

Figure 6:
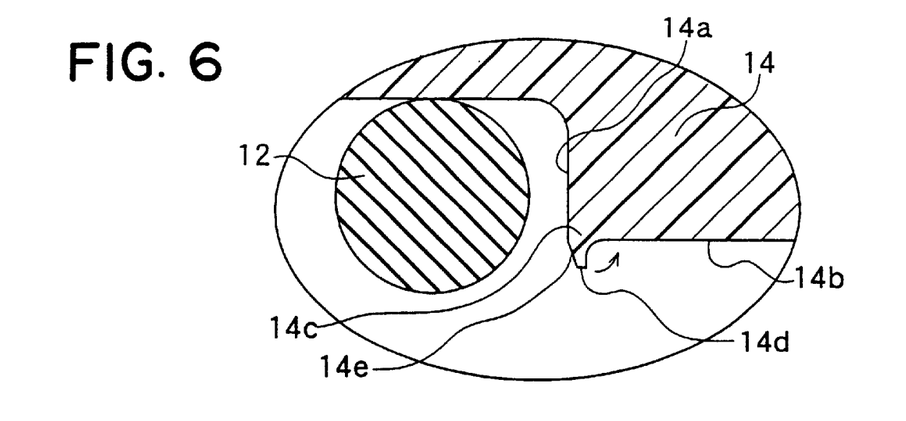
FIG. 6 is a schematic sectional view of a protrusion portion of a modified first embodiment.

Here, the shape of the projection portion 14d may be modified as shown in FIG. 6. That is, a tapered portion 14e may be formed at a tip of the projection portion 14d. In this case, the projection portion 14d is facilitated to fall down to the opposite side of the O-ring (a direction indicated by an arrow in FIG. 6) during the assembling process.

Figure 7A:
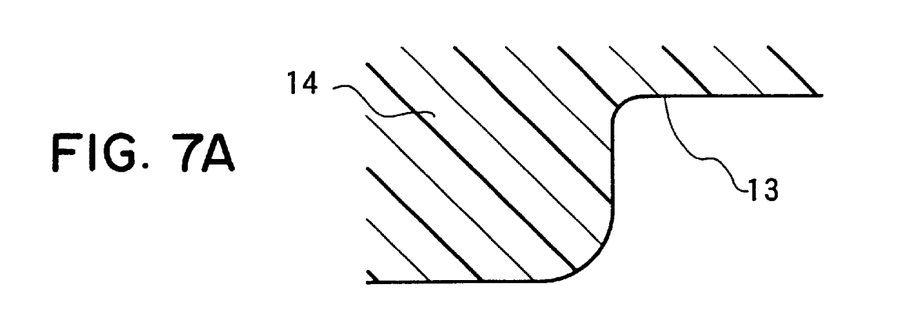
FIGS. 7A and 7B are schematic sectional views illustrating a method of manufacturing the pressure detection apparatus of a modified first embodiment.
Figure 7B:
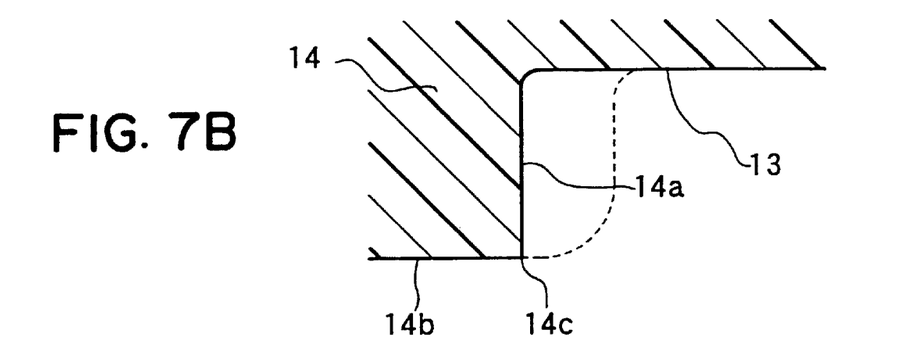

Furthermore, a manufacturing step as shown in FIGS. 7A and 7B may be applied to form the O-ring squeezing protection structure to the corner portion 14c of the outer peripheral wall 14.

In the manufacturing step shown in FIGS. 7A and 7B, at first, the connector case 3 is formed by using the same steps as described molding-forming process (described with reference to FIG. 4). Thus, the connector case 3, in which the groove 13 is formed at one end surface of the connector case 3 at a peripheral position, which positions at the outer peripheral portion of the pressure detection chamber 10, is completed. FIG. 7A shows the groove portion 13 and the outer peripheral wall 14 at this stage.

After that, a corner portion adjusting process as shown in FIG. 7B will be performed. That is, a radius of curvature of the corner portion 14c is reduced compared to that just after the molding-forming process, and is reduced to less than 0.1 mm, by cutting of the side surface 14a of the outer peripheral wall 14 (outer peripheral sidewall surface of the groove portion 13). Thus, the corner portion 14c becomes the above-described O-ring squeezing protection structure.

Next, the assembling process is performed. As a result, the pressure detection apparatus 100 as shown in FIG. 1 can be completed.

(Second embodiment)

In the first embodiment, the wall portion is defined by the outer peripheral wall 14, which is integrally formed with the connector case 3. On the contrary, this second embodiment is different from the first embodiment in that a ring body, which is made of resin and is separately provided with the connector case 3 and the housing 4, is applied as the wall portion. Difference between the first embodiment will be mainly explained.

Figure 8:
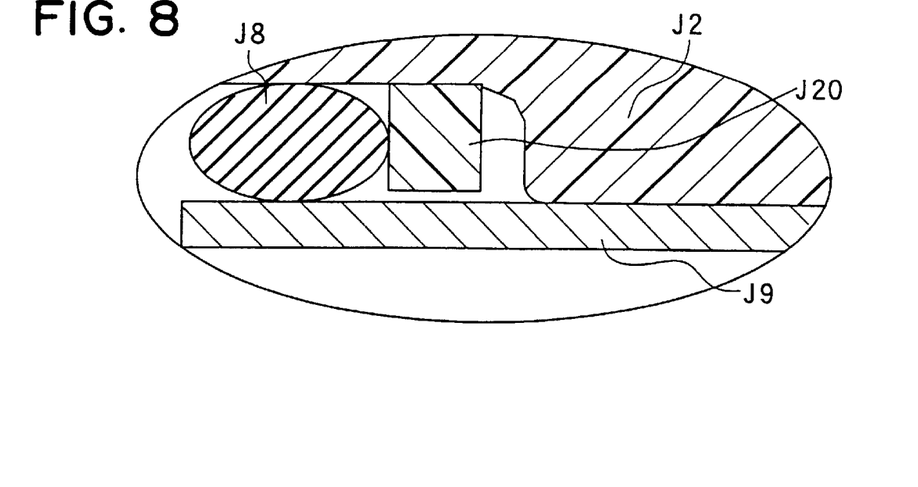
FIG. 8 is a schematic sectional view illustrating an arrangement structure of a backup-ring of a related art.

Here, in the O-ring sealing type pressure detection apparatus, a backup-ring is generally used for the purpose of preventing a protrusion of the O-ring to the gap. FIG. 8 shows an example of a structure of a related art in which the backup-ring J20 is applied. In detail, the backup-ring J20 having a height lower than a depth of the O-ring groove is arranged at an outer peripheral side of the O-ring J8 in the O-ring groove of the pressure detection apparatus shown in FIG. 13.

The backup-ring is made of a resin such as a tetrafluoroethylene resin or a softened tetrafluoroethylene resin, which is softened by adding filler. Furthermore, in a cylindrical seal structure in which a seal is performed at an outer peripheral side surface of the ring, the backup-ring having the height lower than the depth of the O-ring groove is used from a viewpoint of easy mounting. In general, this way of thinking is applicable in a flat plane seal structure in which a seal is performed at upper surface and a lower end surface of the backup-ring.

However, according to the flat plane seal structure, when the height of the O-ring is lower than the depth of the O-ring groove, a gap is defined above the O-ring, so that an effect of the backup-ring may be decreased. However, according to the flat plane structure, the O-ring can be mounted even if its height is higher than the O-ring groove, and the O-ring can be easily squeezed because of its soft material. This embodiment has conceived in view of a merit of the flat plane seal structure using the backup-ring.

Figure 9:
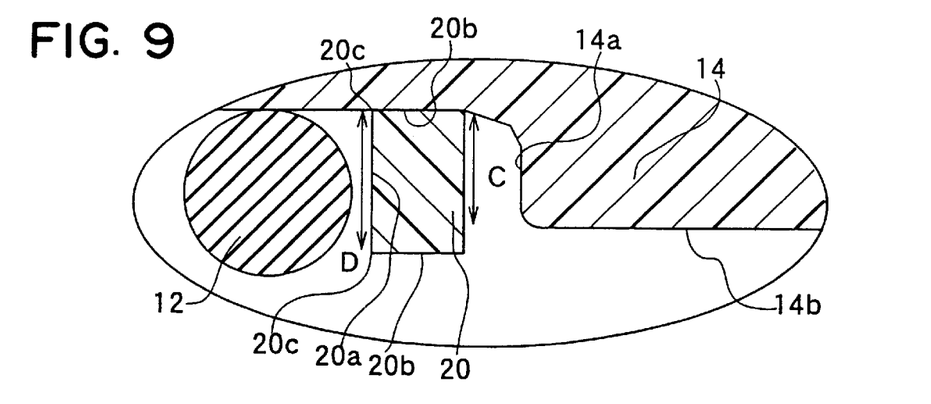
FIG. 9 is a schematic sectional view illustrating a first example of a second embodiment of the present invention.
Figure 10:
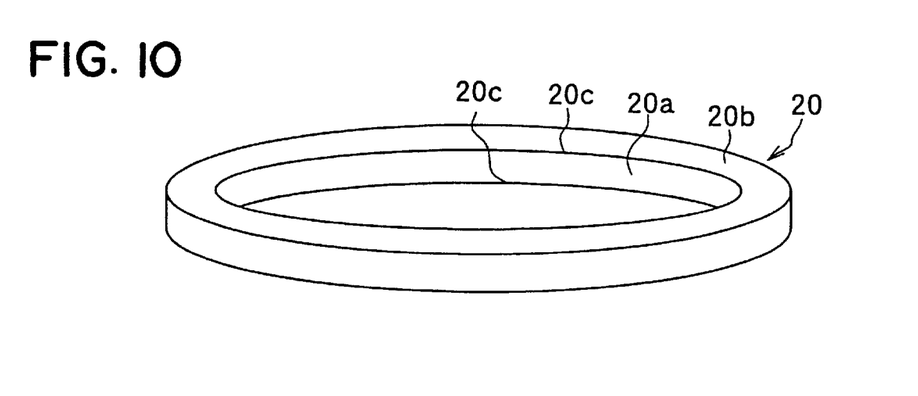
FIG. 10 is a perspective view of a ring 20 in FIG. 9.

FIG. 9 shows a first example in which a ring body 20 made of resin is employed as the wall portion according to this embodiment. FIG. 10 shows a perspective view of the ring body 20 (the wall portion or a resin ring).

Here, in this embodiment, the outer peripheral wall 14 does not need to have the above-described O-ring squeezing protection structure; that is, it may not have that structure (that is, the radius of curvature is 0.1 mm–0.2 mm).

As shown in FIGS. 9 and 10, the ring body 20 of the first example can be made of the same resin as that of the backup-ring, and have a rectangular sectional shape in a direction perpendicular to the ring forming surface. The ring body 20 can be assembled by arranging into the groove portion 13 with the O-ring 12 during the assembling process. Before being assembled, the ring body 20 has the height (dimension D in FIG. 9) higher than a depth (dimension C in FIG. 9) of the groove portion 13.

Furthermore, in the assembling process, the ring body 20 thicker than the depth of the groove 13 is mounted on the outer peripheral portion of the O-ring 12 in the groove portion 13. The O-ring 12 and the ring body 20 are pressed, while the groove portion 13 is covered with the press member 9 of the housing 7, so that the O-ring 12 and the ring body 20 are sandwiched and fixed by the connector case 3 and the press member 9.

Here, in the case of the ring body 20 whose dimension D is larger than the dimension C, the ring body 20 forms the wall portion by being crushed alike the backup-ring, and forms a flat plane seal structure in which the seal is performed by both upper and lower end surfaces of thereof. According to the ring body 20 as the wall portion, an inside surface 20a corresponds to a first surface, the upper and the lower end surfaces 20b each of which contacting with the connector case 3 and the press member 9 corresponds to a second surface, and a corner portion 20c defined by the inside surface 20a and the end surface 20b corresponds to the corner portion.

In the ring body 20 as the wall portion, since the corner portion 20c is the above-described O-ring squeezing protection structure (see FIGS. 2 and 3), the effect of the O-ring squeezing protection structure can be achieved alike the first embodiment.

Figure 11A:
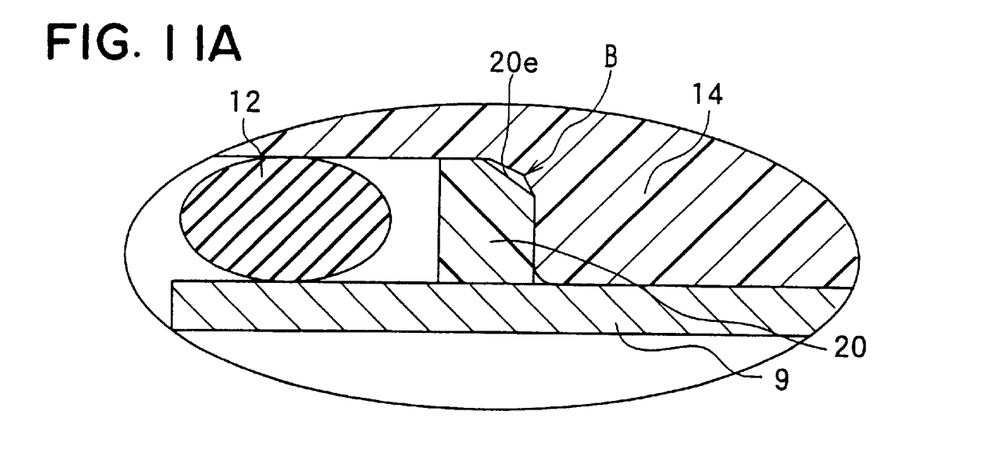
FIG. 11A is a schematic sectional view illustrating a second example of the second embodiment.
Figure 11B:
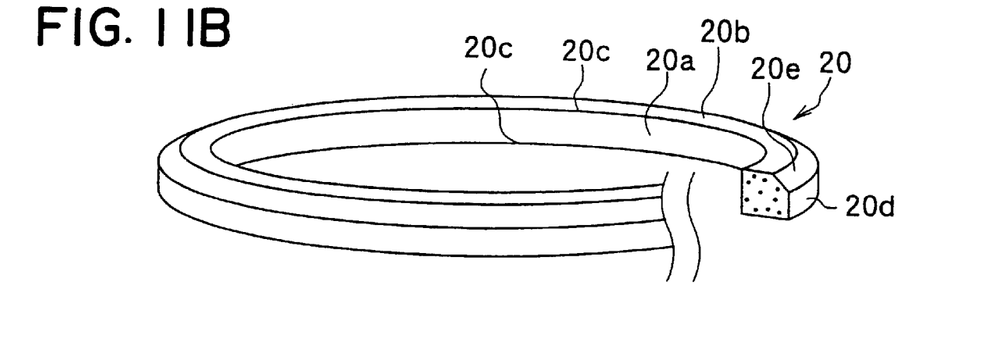
FIG. 11B is a perspective view of a ring 20 in FIG. 11A.
Figure 11C:
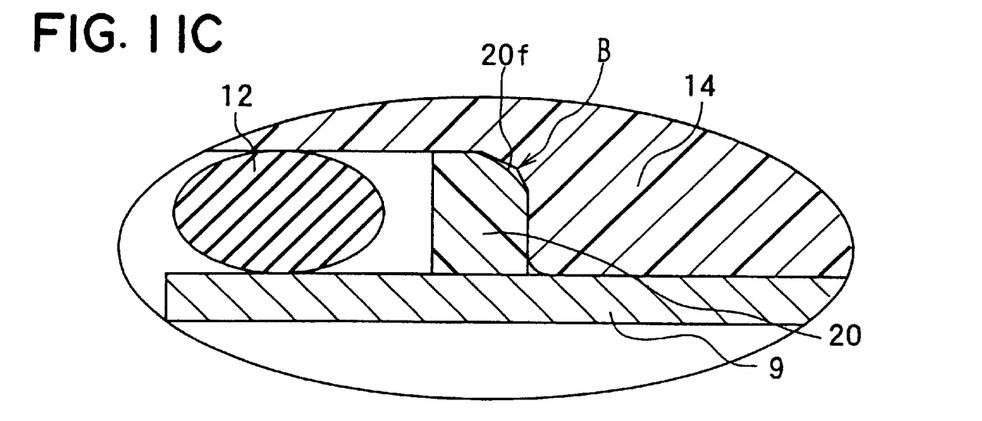
FIG. 11C is a schematic sectional view illustrating a modified second example of the second embodiment.

FIGS. 11A and 11B show a second example of this embodiment. This example is a modification of the first example. In this example, a tapered portion is formed at a corner portion defined by the end surface 20b and an outside surface 20d of the ring body 20.

In this flat plane seal structure, portion B of the groove portion 13 shown in FIG. 11A causes a round portion due to the same reason as that of the corner portion of the wall portion of the related art. Therefore, according to the ring body 20 having a rectangular sectional shape in a direction perpendicular to the ring forming surface, as shown in FIG. 9, the ring body 20 is not completely fitted to the outer peripheral wall 14 due to the portion B.

In order to prevent this incomplete fitting of the ring body 20, as shown in FIG. 11B, an oblique surface (chamfer portion) 20e is provided to a portion of the ring body 20, where corresponds to the portion B. Thus, the ring body 20 can be adequately fitted to the outer peripheral wall 14 including the portion B. Furthermore, a round portion (chamfer portion) 20f, whose radius of curvature is larger than that of the portion B, may be formed at the corner portion of the ring body 20 instead of the oblique surface 20e.

Figure 12A:
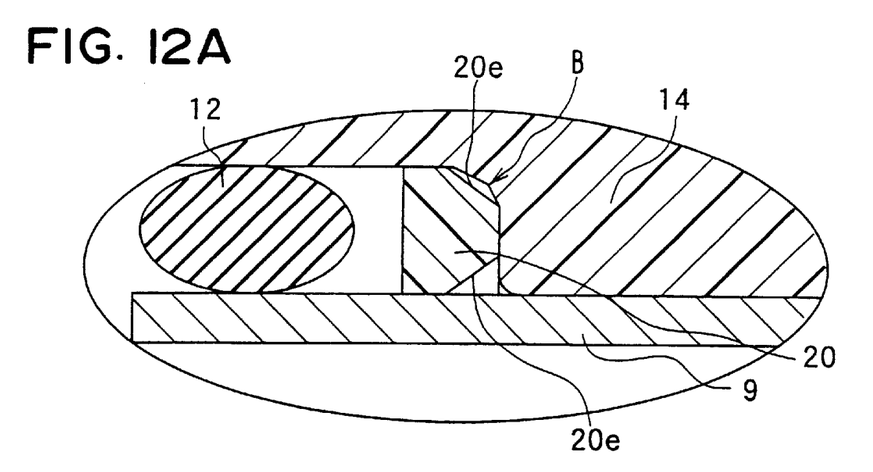
FIG. 12A is a schematic sectional view illustrating a third example of the second embodiment.
Figure 12B:
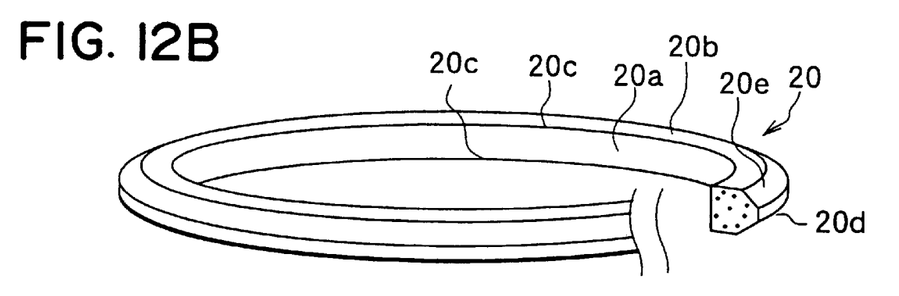
FIG. 12B is a perspective view of a ring 20 in FIG. 12A.
Figure 12C:
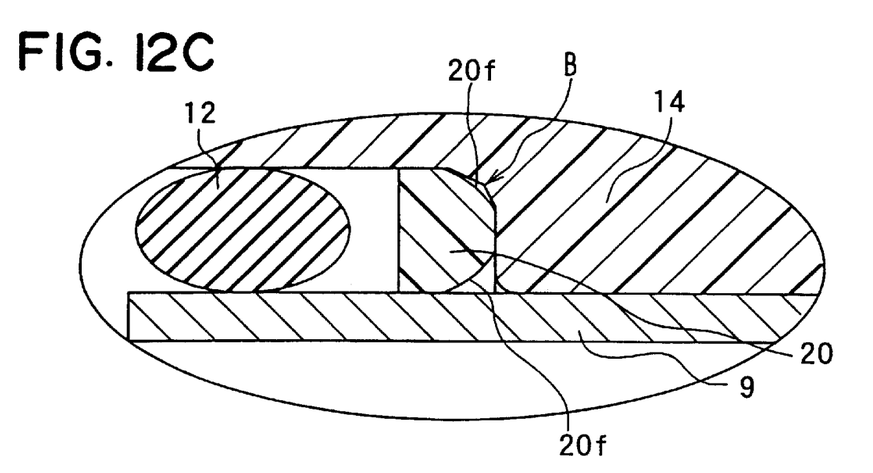
FIG. 12C is a schematic sectional view illustrating a modified third example of the second embodiment.

FIGS. 12A and 12B show a third example of this embodiment. In the second example, the oblique surface 20e or the round portion 20f is provided only one corner corresponding to the portion B. On the contrary, in the third example, the oblique surface 20e or the round portion 20f is provided both an upper corner and a lower corner at outer peripheral side of the ring body 20, so that one of the oblique surface 20e (as shown in FIGS. 12A and 12B) and the round portion 20f (as shown in FIG. 12C) is symmetry provided. In this case, the ring body 20 can be adequately fitted to the outer peripheral wall 14 even if the ring body 20 is assembled in upside-down.

The second and the third examples can achieve the same result as that of the first example.

Furthermore, since the corner portion 14c of the outer peripheral wall 14 of the groove portion 13 may be formed substantially the same as that of the related art, a total process of the manufacturing step may be reduced compared to the former embodiment in which the projection portion 14d is formed in the connector case 3.

(Modifications)

The connector case 3 may be made of another resin other than the PPS, and further may be made of metal, which is manufactured by being pressed or forged, instead of the resin.

Furthermore, the housing 7 as the second case may have no press member 9. In this case, an end surface, at which the press member 9 is provided, acts as the press member.

The outer peripheral wall 14 of the groove portion 13 corresponds to the wall portion; however, the wall portion may not be defined by the outer peripheral wall 14. For example, when the depression portion is formed by only the outer peripheral wall 14 by removing the inside wall of the groove portion 13, the sidewall of the depression portion corresponds to the wall portion. Furthermore, the wall portion may be integrally formed with the housing 7 instead of the connector case 3, and the second surface may contact with the connector case 3.

In other words, in the O-ring sealing type pressure detection apparatus, when a wall portion member for restricting a movement of the O-ring to the outer peripheral direction is provided at [1] one of assembled first case and second case, or at [2] outer side of the O-ring separately provided from the first and the second cases, the wall portion becomes the wall portion of the present invention.

Furthermore, the wall portions 14, 20 for the O-ring 12 can be applied to the other pressure detection apparatus, in which the above-described embodiments are partly modified.

What is claimed is:

1. A pressure detection apparatus comprising:
    a main body having a first case, a second case, and a pressure detection chamber defined by assembling the first case and the second case;
    an O-ring for liquid-tightly sealing the pressure detection chamber, being provided at an outer peripheral portion of the pressure detection chamber and being sandwiched by the first case and the second case; and
    a wall portion being provided at opposite side of the pressure detection chamber with respect to the O-ring, including:
        a first surface being contacted with the O-ring, for restricting a movement of the O-ring toward an outer peripheral direction when a pressure to be detected is applied to the pressure detection chamber; and
        a second surface being contacted with one of the first case and the second case, and defining a corner portion with the first surface;
        wherein a distance between an end of the first surface and the second surface is less than 0.1 mm.

2. A pressure detection apparatus according to claim 1, wherein:
    the second case sandwiches the O-ring with the first case by contacting the second surface, and
    the corner portion has an O-ring squeezing protection member being provided at the corner portion to contact with the second surface, and being projected from the first surface toward the O-ring.

3. A pressure detection apparatus according to claim 1, wherein the wall portion is integrally formed with the first case, and the second surface contacts with the second case.

4. A pressure detection apparatus according to claim 1, wherein the first case is made up of a resin formed by molding.

5. A pressure detection apparatus according to claim 1, wherein the second case is comprised of a metal and is formed by being pressed.

6. A pressure detection apparatus according to claim 1, wherein a sensor element for detecting pressure to be detected is contained in the pressure detection chamber.

7. A pressure detection apparatus according to claim 1, wherein an oblique surface is disposed between the end of the first surface and the second surface.

8. A pressure detection apparatus comprising:
    a main body having a first case, a second case, and a pressure detection chamber defined by assembling the first case and the second case;
    an O-ring for liquid-tightly sealing the pressure detection chamber, being provided at an outer peripheral portion of the pressure detection chamber and being sandwiched by the first case and the second case; and
    a wall portion being provided at opposite side of the pressure detection chamber with respect to the O-ring, including:
        a first surface being contacted with the O-ring, for restricting a movement of the O-ring toward an outer peripheral direction when a pressure to be detected is applied to the pressure detection chamber; and
        a second surface being contacted with one of the first case and the second case, and defining a corner portion with the first surface;
        wherein a radius of curvature of the corner portion is set less than 0.1 mm,
        the corner has an O-ring squeezing protection member being provided at the corner portion and being projected from the first surface toward the O-ring, and
        the radius of curvature of the corner portion is defined by a radius of curvature of the O-ring squeezing protection member.

9. A pressure detection apparatus comprising:
    a main body having a first case, a second case, and a pressure detection chamber defined by assembling the first case and the second case;
    an O-ring for liquid-tightly sealing the pressure detection chamber, being provided at an outer peripheral portion of the pressure detection chamber and being sandwiched by the first case and the second case; and
    a wall portion being provided at opposite side of the pressure detection chamber with respect to the O-ring, including:
        a first surface being contacted with the O-ring, for restricting a movement of the O-ring toward an outer peripheral direction when a pressure to be detected is applied to the pressure detection chamber; and
        a second surface being contacted with one of the first case and the second case, and defining a corner portion with the first surface;
        wherein a radius of curvature of the corner portion is set less than 0.1 mm,
        the wall portion further being provided separately from the first case and the second case.

10. A pressure detection apparatus according to claim 9, wherein the wall portion includes a ring body made of a resin harder than the O-ring.

11. A pressure detection apparatus comprising:
    a main body having a first case, a second case, and a pressure detection chamber defined by assembling the first case and the second case;
    an O-ring for liquid-tightly sealing the pressure detection chamber, being provided at an outer peripheral portion of the pressure detection chamber and being sandwiched by the first case and the second case, and
    a groove portion provided at the first case, for accommodating the O-ring; and
    a protrusion protruding from a portion of the first case where the protrusion connects to an open end of the groove portion, and the portion being located outer of the O-ring in the first case.

12. A pressure detection apparatus according to claim 7, wherein the protrusion is fallen down when the first case is assembled with the second case to regulate a corner portion that is defined with the first and second cases.

* * * * *